(No Model.) 2 Sheets—Sheet 1.

J. KROOG.
COMPOUND FILTERING PLATE.

No. 365,134. Patented June 21, 1887.

Witnesses.
Perry B. Hills
Robert Everett

Inventor:
Johann Kroog,
By James L. Norris
Atty.

(No Model.) 2 Sheets—Sheet 2.

J. KROOG.
COMPOUND FILTERING PLATE.

No. 365,134. Patented June 21, 1887.

Witnesses.
Percy B. Hills
Robert Everitt

Inventor.
Johann Kroog,
By James L. Norris
Atty.

UNITED STATES PATENT OFFICE.

JOHANN KROOG, OF HALLE-ON-THE-SAALE, PRUSSIA, GERMANY.

COMPOUND FILTERING-PLATE.

SPECIFICATION forming part of Letters Patent No. 365,134, dated June 21, 1887.

Application filed March 22, 1887. Serial No. 231,974. (No model.)

*To all whom it may concern:*

Be it known that I, JOHANN KROOG, of the city of Halle-on-the-Saale, in the Kingdom of Prussia, and German Empire, have invented a certain new and useful Improvement in Compound Filtering-Plates, of which the following is a specification, reference being had to the accompanying drawings, and to the letters of reference marked thereon.

This invention relates to improvements in compound filtering-plates.

In filtering-presses for treating liquids fluted filtering-plates have heretofore been chiefly used under the filtering-cloths, and they have always been found a sufficient support for the filtering-cloths in all cases where the pressure used in filtering with presses of this kind has been but small. When working with greater pressures, however, it has been found that the cloths are pressed into the flutes and get spoiled, or even torn. This trouble might be removed by using only plates with very small and narrow flutes; but both the construction and the use of all the narrow-fluted plates which have been heretofore constructed with a view to avoid this difficulty have called forth other difficulties and disadvantages.

It has been tried to obviate the difficulty above-named when using the usual wide-fluted plates by covering the latter with perforated plates of sheet metal. The result thereby obtained has been this, that the filtering-plates were thus preserved in good condition, but the process of filtering took up much more time, owing to the smaller filtering-surface thus obtained, and besides the plates were much more difficult to clean.

The object of my invention, therefore, is to remove the difficulties connected with the fluted filtering-plates as heretofore generally employed, and to devise a new and improved construction for the said plates, offering also other new technical advantages, which will be more readily understood from this specification.

Figure 3:
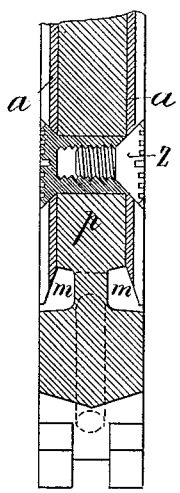
Figure 1:
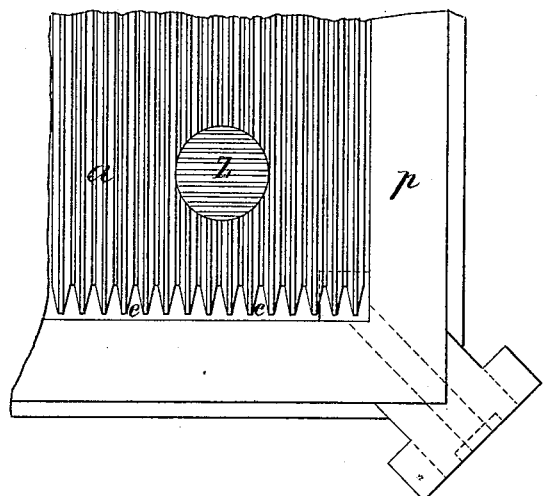
Figure 2:
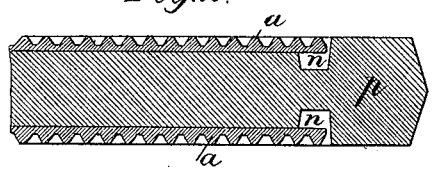
Figure 4:
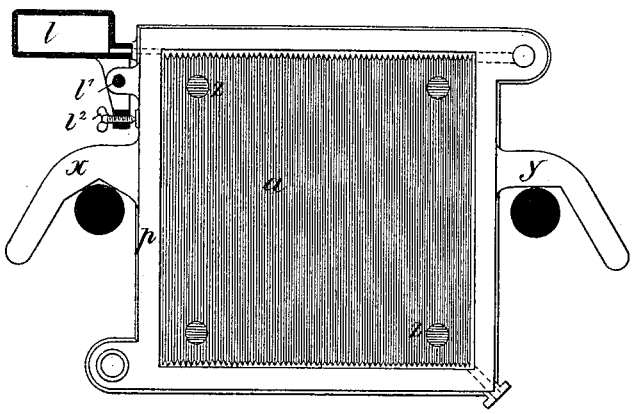
Figure 5:
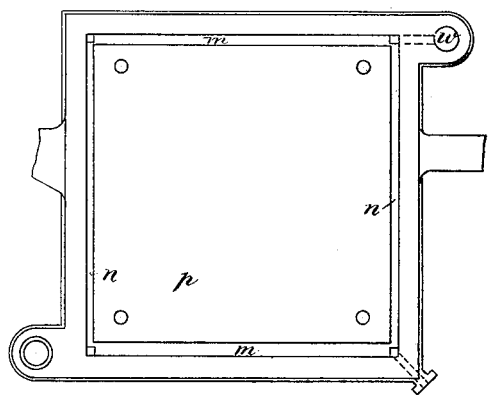
Figure 7:
Figure 6:
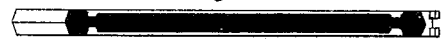
Figure 8:
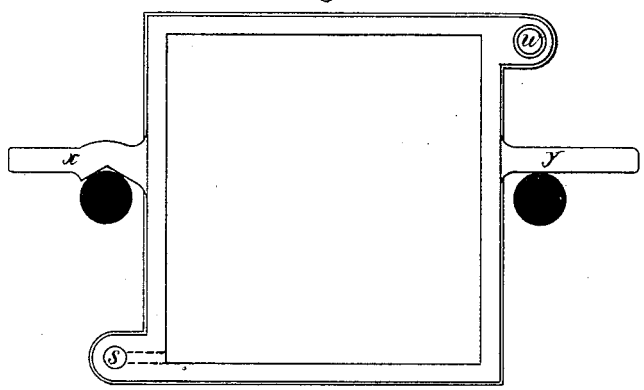
Figure 9:
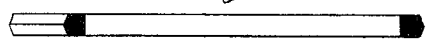

In the accompanying drawings, forming part of this specification, Figure 1 is a view of part of my improved filtering-plate. Fig. 2 is a horizontal section, and Fig. 3 a vertical section, of the same. Fig. 4 is a view of the entire filtering-plate with an air-reservoir attached thereto laterally. Fig. 5 is a view of the bare plate; Fig. 6, a horizontal section, and Fig. 7 a vertical section thereof. Figs. 8 and 9 are front views and horizontal sections, respectively, of the frame belonging to the said plate. Figs. 10 to 13, inclusive, are views and sections of the fastening-screws for the said plates.

Figure 10:
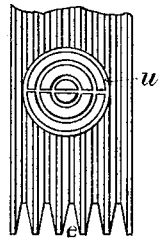
Figure 11:
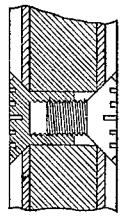
Figure 12:
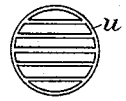
Figure 13:
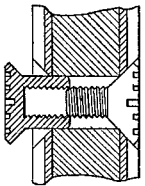

My improved filtering-plate is constructed as follows: The plates $a\ a$, fluted on the outer side, are so fastened to both sides of the solid body of the plate $p$ as to project beyond the flat canals $m\ m$ and their connecting-canals $n\ n$. In order to allow the filtered material to leave the flutes, the inner edges of the thin plates $a\ a$ are beveled sufficiently above and below to form the openings $e\ e$, Figs. 1 and 10. It will be seen that these openings are very easily formed even when the flutes are very narrow. The surfaces of the fastening-screws $z$ are also fluted, and in order to allow the filtered liquid to escape more readily from the fluted heads and nuts of the said fastening-screws and to reach the flutes of the plates $a\ a$, whatever be the position of the said heads or nuts, the edges of the said heads and nuts are cut away or beveled, so as to form a circular groove, $u$, Figs. 10 to 13. The screw-heads may also be provided with circular grooves communicating with each other through the split of the heads, as shown in Figs. 10 and 11.

It will be readily seen that in the manner above described filtering-plates may be formed with very narrow flutes without presenting any constructional difficulties and still offering a ready escape to the filtered liquid. By reason of this another new technical result is arrived at in using the said improved filtering-plates, as will be hereinafter shown.

It is a well-known fact that in order to obtain favorable results in filtering it is absolutely necessary to remove the air from those plates of the filter-press into which the water or other liquid used for lixiviation, edulcoration, or washing enters. In the large fluted plates as heretofore generally used the air-reservoirs or air-collectors, which have in some cases been provided by me for this purpose on the press, had to be of a correspondingly large size, thus rendering it impossible to arrange them at the sides of the filtering-press for want of room. When using my improved narrow-fluted filtering-plates, however, the space to be freed of air is very small, by reason of the narrow flutes or grooves, and thus the correspondingly-reduced size of the air reservoirs or collectors admits of arranging them on the sides of the press in a very practical manner, as shown in Fig. 4, the said reservoir $l$ being here held by the bolt $l'$, and fastened in position by means of the thumb-screw $l^2$.

Having thus described my invention, what I claim as new, and desire to secure by Letters Patent, is—

1. A filtering-plate for filter-presses, consisting of the solid plate $p$ and the thin plates $a\ a$, fluted on their outer surfaces and having the inner sides of their top and bottom edges beveled, as described, said fluted and beveled plates being secured, respectively, to the outer sides of the solid plate, substantially as described.

2. The combination, in a filtering-plate, of the solid plate $p$, the fluted and beveled thin metal plates $a\ a$, arranged, respectively, at opposite sides of the solid plate, and screws $z$, passing through the plates and having fluted heads and nuts, substantially as described.

3. A filtering-plate for filter-presses, consisting of the solid plate $p$, having the air-reservoir $l$, the bolt $l'$, attaching the reservoir thereto, the screw $l^2$, and the plates $a\ a$, fluted on their outer surfaces and having the inner sides of their top and bottom edges beveled, as described, said fluted and beveled plates being secured, respectively, to the outer sides of the solid plates, substantially as and for the purposes described.

In testimony whereof I have signed my name to this specification in the presence of two subscribing witnesses.

JOHANN KROOG.

Witnesses:
A. D'HEUREUSE,
EMIL WOLF.